United States Patent
Böhm et al.

[11] Patent Number: 6,126,570
[45] Date of Patent: Oct. 3, 2000

[54] SHIFT SYNCHRONIZATION USING DECAYING TORQUE

[75] Inventors: Andreas Böhm, Wennigsen; Gerhard Böckmann, Laatzen, both of Germany; James Henry DeVore, Laurinburg, N.C.; Jon Michael Huber, Laurinburg, N.C.; Robert Anthony Sayman, Laurinburg, N.C.

[73] Assignee: ZF Meritor, Laurinburg, N.C.

[21] Appl. No.: 09/347,658

[22] Filed: Jul. 6, 1999

[51] Int. Cl.[7] .................................................. B60K 41/06
[52] U.S. Cl. ............................................ 477/107; 477/109
[58] Field of Search .................................... 477/101, 107, 477/109; 74/337

[56] References Cited

U.S. PATENT DOCUMENTS

| | | | |
|---|---|---|---|
| 5,573,477 | 11/1996 | Desautels et al. | 477/109 |
| 5,785,627 | 7/1998 | Uno et al. | 477/109 |
| 5,827,151 | 10/1998 | Sawamura et al. | 477/109 |
| 5,839,987 | 11/1998 | Sawamura et al. | 477/107 |
| 5,863,275 | 1/1999 | Nozaki et al. | 477/107 |
| 5,876,301 | 3/1999 | Tabata et al. | 477/109 |
| 5,980,424 | 11/1999 | Huber et al. | 477/109 |
| 6,015,366 | 1/2000 | Markyuech et al. | 477/109 |

*Primary Examiner*—Sherry Estremsky
*Attorney, Agent, or Firm*—Carlson, Gaskey & Olds

[57] ABSTRACT

A method of engaging and disengaging transmission gears in a vehicle is provided. A controller processes an initial torque representing an engine torque and an estimated zero torque representing an estimate of a transmission output shaft torque. The controller also sets a high and low band torque about the estimated zero torque. Once the above torques have been determined, the controller compares the initial torque to the high band torque. If the initial torque is below the high band torque, the controller increases the engine torque to the high band torque. If the initial torque is greater than the high band torque, then no preliminary adjustments to the engine torque need be made. At least one shift valve is energized when the engine torque is equal to or greater than the high band torque. The engine torque is decayed by the controller to the low band torque to facilitate engaging and disengaging transmission gears.

13 Claims, 2 Drawing Sheets

SHIFT SYNCHRONIZATION USING DECAYING TORQUE

BACKGROUND OF THE INVENTION

This invention relates to an engine control system that breaks the torque lock typically found in a transmission with engaged gears, allowing the transmission to be moved to neutral without actuating the clutch.

A manual transmission typically slides a clutch collar relative to different gears to engage one of the gears. To complete a shift, typically an operator or the system must first move the gear that is presently engaged out of engagement to a neutral position. In some heavy vehicle transmissions, the movement out of engagement is performed by a hydraulic piston, also known as a "shift-by-wire" system.

When the transmission is engaged and rotational drive is being transmitted from the engine to the transmission, there is a large torque load, or "torque lock," holding the gears and the clutch collar together at a particular axial position. This torque load makes it quite difficult, if not impossible, to move the clutch collar out of engagement without somehow reducing the torque load.

To this end, vehicles with manual transmissions have historically been equipped with clutches. An operator actuates the clutch which breaks the coupling between the engine output shaft and the transmission output shaft. The torque load goes to zero, and the operator is able to move the gear out of engagement. As an alternative, control systems have been developed which estimate the transmission output torque and the engine torque and then adjust the engine torque until it matches the transmission output torque. When the torques match, the torque load is zero and a shift may be made without clutching or manipulating the accelerator or brakes for a "clutchless" shift.

Many of these systems have "dithered" the engine torque up and down about the estimated transmission output torque so that the engine torque will eventually equal the transmission output torque. Control systems that utilize dithering require that the engine torque be fluctuated. Therefore, it is desirable to provide a vehicle drive system that utilizes a control system which provides smooth shifts.

SUMMARY OF THE INVENTION AND ADVANTAGES

The present invention provides a method of engaging and disengaging transmission gears in a vehicle. A controller processes an initial torque representing an engine torque and an estimated zero torque representing an estimate of a transmission output shaft torque. The controller also sets a high and low band torque about the estimated zero torque. Once the above torques have been determined, the controller compares the initial torque to the high band torque. If the initial torque is below the high band torque, the controller increases the engine torque to the high band torque. If the initial torque is greater than the high band torque, then no preliminary adjustments to the engine torque need be made. At least one shift valve is energized when the engine torque is equal to or greater than the high band torque. The engine torque is decayed by the controller to the low band torque to facilitate engaging and disengaging transmission gears.

Accordingly, the above method provides a control system that does not oscillate the engine torque about the estimated transmission output torque. As a result, a smoother, more consistent shift may be obtained.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1A:
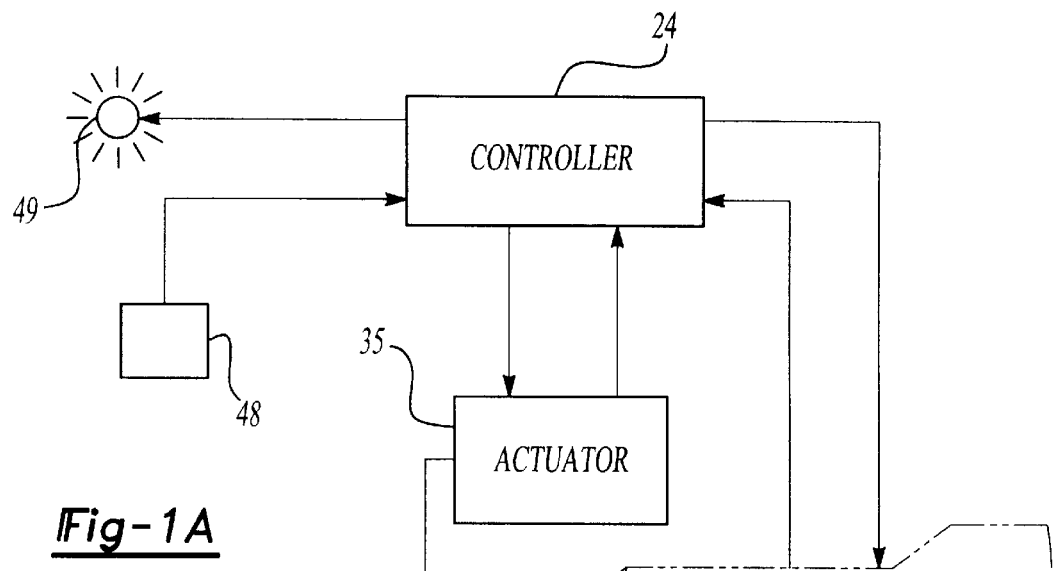
FIG. 1A is a schematic view of a drive system for a vehicle including a transmission.

A drive train for a vehicle is illustrated generally at 20 in FIG. 1A. Drivetrain 20 includes an engine 22 and a controller 24 which controls the output speed of engine 22. Controller 24 typically controls the amount of fuel delivered to engine 22 to regulate the output speed and torque. Controller 24 may be a single unit or several functionally specialized units coupled together. Engine 22 has an output shaft 23 that passes through a clutch 26 to drive a multi-speed transmission 28. The transmission 28 may be of any type known in the art.

The operator may request that the gear shift be effectuated by an electronically controlled actuator 35 that is coupled to controller 24 and actuated by switch 48, discussed in more detail below.

Transmission 28 includes a gear 32 which is driven by the output of engine 22 when clutch 26 is closed to a transmission input shaft 27. Gear 32 is coupled to an input shaft 27 which engages and drives a pair of gears 36 each mounted on a countershaft 37. Only one gear 36 and countershaft 37 are shown. Countershaft 37 rotates several gears 38, only two of which are shown. Gears 38 engage and rotate a plurality of gears 39 that are mounted to freely rotate on a main output shaft 40.

A shift yoke 42 slides a shift collar 44 as directed by the vehicle operator to change the speed ratio of the transmission 28. In the illustrated transmission, collar 44 is internally splined to rotate with shaft 40, but may slide axially along shaft 40. Collar 44 also has external teeth 45 that are selectively received within an inner peripherally toothed bore 41 on a gear 39, best shown in FIG. 1B. When the shift collar 44 is in the position shown in FIG. 1A, the teeth 45 engage the gear 39 such that the gear 39 rotates the collar 44, and hence the shaft 40. Thus, in the position shown in FIG. 1A, the engine drives the gear 32, which drives gears 36 and countershafts 37. The countershafts 37 drive the gears 38, which drive the gears 39.

Since the collar 44 is engaged to rotate with one gear 39, then the shaft 40 will be rotated at a speed which is dependent on the gear reduction at the selected gear 39. When one wishes to shift the transmission to another speed, another gear 39 is selected and engaged. By varying the gear reductions between the several gears 39, transmission 28 is able to selectively achieve several distinct output speed ratios for shaft 40 relative to input from engine 22.

Figure 1B:
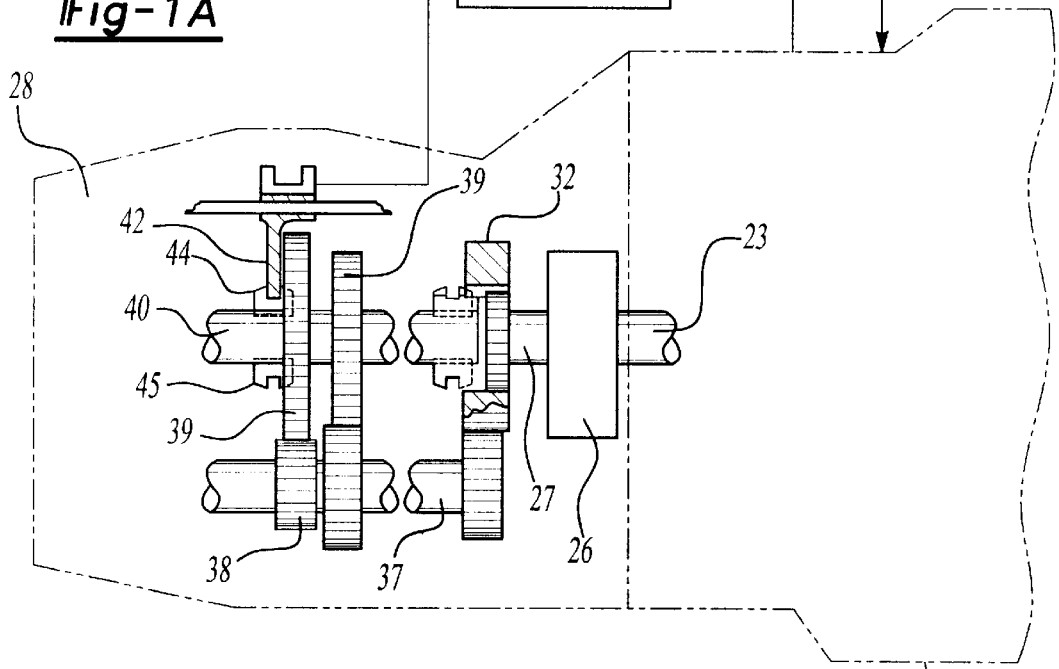
FIG. 1B is a transmission of the system in FIG. 1A in neutral.
Figure 1B:
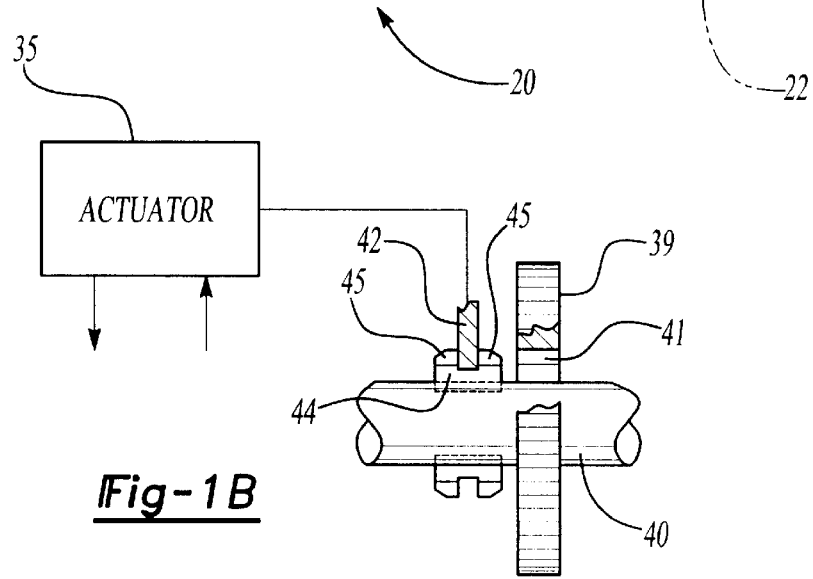

In moving the collar 44 to shift to another speed ratio, the initial step is to move the teeth 45 out of engagement from the inner peripherally toothed bore 41 of the gear 39 to the neutral position shown in FIG. 1B. When the drive train 20 is transmitting rotation to the shaft 40 through the arrangement as shown in FIG. 1A, however, there is a high torque load on the connection between the teeth 45 and the gear 39 and between collar 44 and shaft 40. This high torque load makes it difficult, if not impossible, to slide the collar 44 relative to the gear 39. For this reason, vehicles have traditionally incorporated a clutch 26. An operator who wishes to shift a transmission to a new speed, initially actuates the clutch. This breaks the torque transmission discussed above, and allows the operator to disengage the transmission and move to neutral.

As discussed above, the prior art allows an operator to shift the transmission to a new speed without operating the clutch. The collar 44 may be actuated by either the driver manipulating the shift knob or by a powered shifting system such as controller 24 and actuator 35. To achieve the ability to shift the gear without clutching a intent switch 48 is provided. The switch 48 is utilized to request an upshift or downshift. The first step in achieving a shift is by eliminating the torque lock that prevents sliding movement of collar 44 from the position shown in FIG. 1A.

The present invention utilizes a method of engaging and disengaging transmission gears in a vehicle. When intent switch 48 is activated, a torque elimination request is sent to controller 24 which processes data to synchronize the engine torque and transmission output torque and shift the transmission gears. The data used by controller 24 may be information stored in tables within the controller or elsewhere, information received from devices on the vehicle, or information calculated by the controller.

Data processed by controller 24 includes an initial torque representing an engine torque and an estimated zero torque representing an estimate of a transmission output shaft torque. The transmission output torque may be estimated in any suitable manner. A rough estimate may be made or a more refined estimate may be made, such as in assignee's copending application Ser. No. 09/275,832, filed on Mar. 25, 1999 entitled "Method of Synchronizing Engine Torque With Vehicle Torque Load for Accomplishing Vehicle Transmission Shifting." Alternatively, the zero torque may be determined by taking an actual reading of the transmission output shaft torque.

Figure 2A:
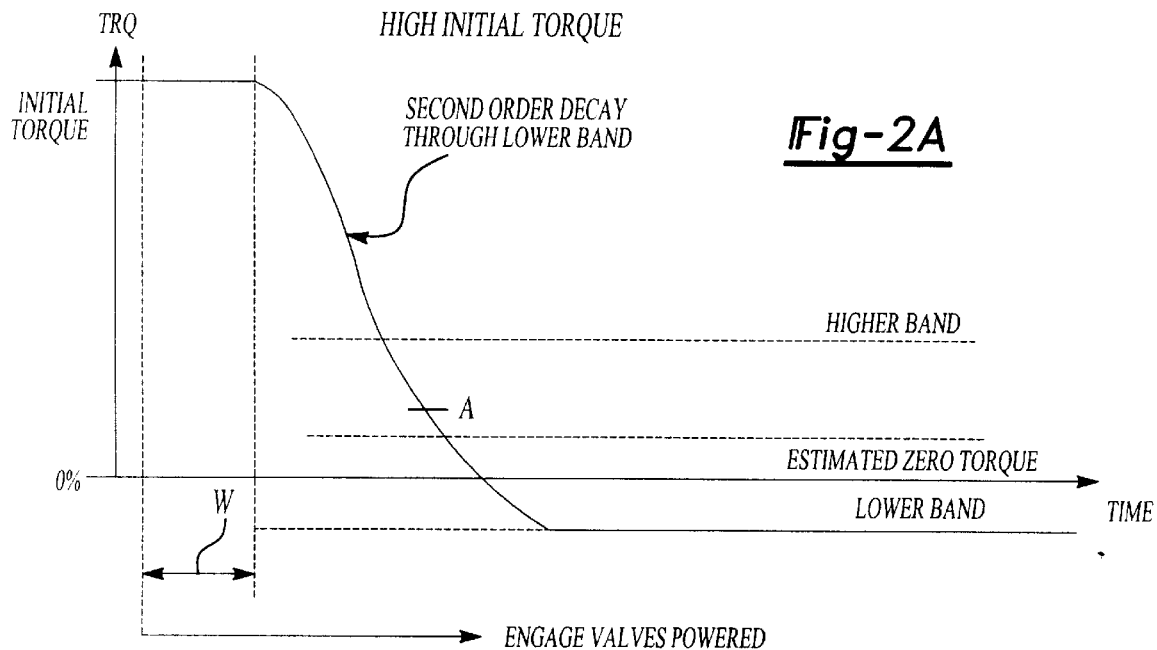
FIG. 2A is a graph of a shift synchronization of a high initial engine torque utilizing the present invention.

Instead of dithering the engine torque about the estimated transmission output torque, as in the prior art, the controller sets a high and low band torque offset from the estimated zero torque so that the estimated zero torque is between the high and low band torques. The high and low band torques may be represented as a percentage of the engine's rated torque or in any other suitable manner. Preferably, the estimated transmission output torque is half way between the high and low band torques, as shown in FIG. 2A. As an example, the high and low band torque may be set to 20% and 10% of the engine's rated torque, respectively. However, these high and low bands are set based upon the gear in which the transmission is presently engaged. The higher the gear, the narrower the range is between the bands; the lower the gear, the wider the range is between the bands.

Figure 2B:
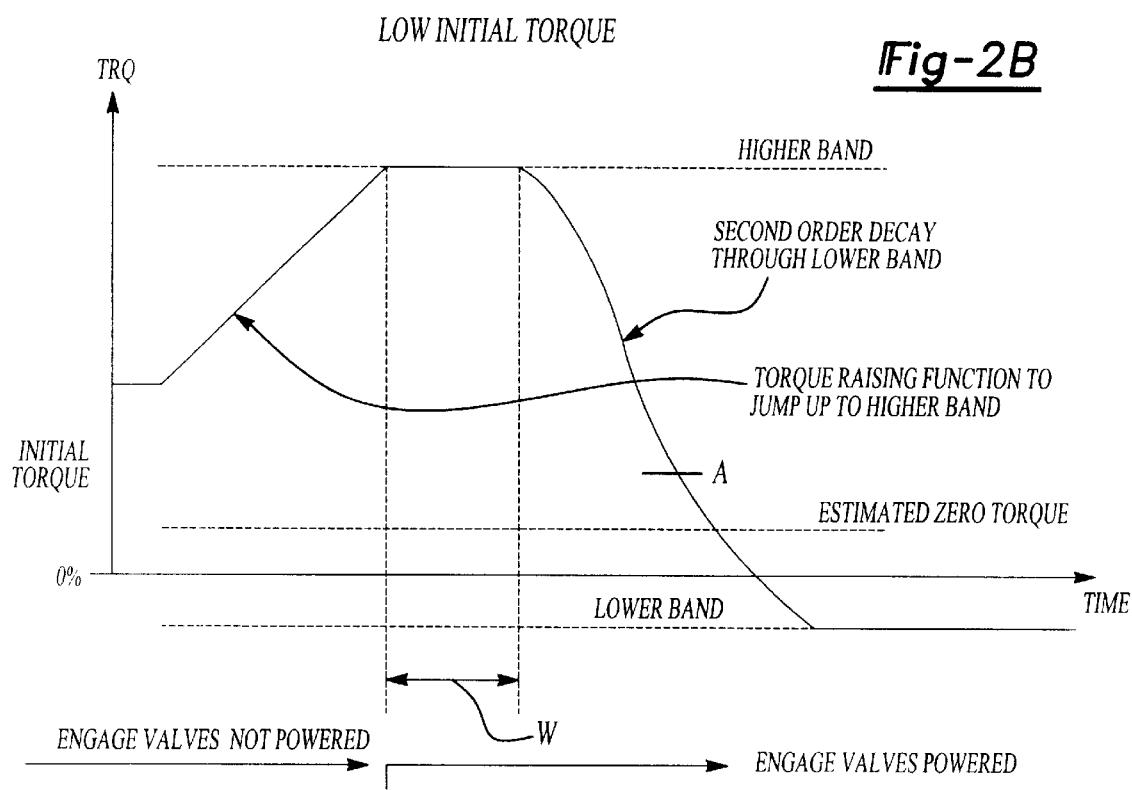
FIG. 2B is a graph of a shift synchronization of a low initial engine torque utilizing the present invention.

Controller 24 compares the initial torque to the high band torque and increases the engine torque to the high band torque if the initial torque is less than the high band torque, as shown in FIG. 2B. Preferably, the engine torque is increased to the high band torque in a linear fashion. If the initial torque is already above the high band torque, as in FIG. 2A, then no initial adjustment is needed. This ensures that the engine torque will be above the estimated transmission output torque, and thus above the actual transmission output torque.

As mentioned above, actuator 35 includes a piston and cylinder drive that shifts the gear by manipulating shift collar 44. The actuator 35 is triggered by at least one shift valve that is electronically energized by controller 24. After switch 48 is activated, the controller sends a signal energizing the shift valve when the engine torque is at the greater of the initial torque and high band torque. The engine torque is maintained at the greater of the initial torque and high band torque for a time, W, until the actuator has had sufficient time to fully energize. This ensures that the actuator will be prepared to shift the gear as soon as the engine torque sufficiently approximates the actual transmission output torque.

The engine torque is decayed, or decreased, as a function of a predetermined equation from the higher of the initial torque and high band torque to the low band torque. As the engine torque approaches the low band torque, the engine torque will approach the actual transmission output torque. As soon as the engine torque sufficiently approximates the actual transmission output torque, the actuator will shift the gear. That is, during the decay, the torque will pass through the actual zero torque load, A. At that time, since the piston is preloaded, the piston should drive the gear out of engagement. If for some reason the actuator is unable to shift the gear, a signal will be sent by the controller to an indicator 49 so that a clutch may be actuated. The indicator may be a light in the vehicle cab.

Engine torque is decayed to the low torque band. Preferably, a second order decay is used to filter engine torque by using the following steps, for example. First the target engine torque, which is the estimated zero torque, is subtracted from a last requested engine torque to yield a first value. The first value is multiplied by a constant representing a percentage of engine torque to yield a second value. The target engine torque is added to the second value to yield a new requested engine torque less than the last requested engine torque thereby decaying the engine torque. The above iteration is repeated until the engine torque has been decayed to the low band torque or the actual transmission output torque. Of course, there are any number of acceptable ways to decrease the engine torque. For example, fueling or any other variable that affects engine torque may be reduced.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of engaging and disengaging transmission gears in a vehicle comprising the steps of:

(a) processing an initial torque representing an engine torque;

(b) processing an estimated zero torque representing an estimate of a transmission output shaft torque;

(c) setting a high and low band torque wherein the estimated zero torque is between the high and low band torques;

(d) comparing the initial torque to the high band torque and increasing the engine torque to the high band torque if the initial torque is less than the high band torque;

(e) beginning to urge a gear out of engagement when the engine torque is at the greater of the initial torque and high band torque; and (f) decaying the engine torque from the higher of the initial torque and high band torque to the low band torque to facilitate engaging and disengaging transmission gears.

2. The method as set forth in claim 1 wherein step (e) occurs after step (d).

3. The method as set forth in claim 1 further including the step of:

(g) actuating an intent switch for preparing the transmission to engage or disengage the transmission gears, wherein step (g) occurs prior to step (a).

4. The method as set forth in claim 1 wherein step (e) energizes an actuator to urge the gear out of engagement.

5. The method as set forth in claim 4 further including the step of:

(h) attempting to actuate the actuator when the engine torque approximates the transmission output shaft torque, wherein step (h) occurs after step (f).

6. The method as set forth in claim 5 further including the step of:

(i) activating an indicator if the actuator fails to become actuated so a clutch can be actuated, wherein step (i) occurs after step (h).

7. The method as set forth in claim 6 further including the step of:

(j) maintaining the engine torque at the greater of the initial torque and high band torque until the actuator has had sufficient time to fully energize, wherein step (j) occurs after step (e).

8. The method as set forth in claim 7 step (f) further includes the step of:

(f1) processing a target engine torque;

(f2) subtracting the target engine torque from a last requested engine torque to yield a first value;

(f3) multiplying the first value by a constant representing a percentage of engine torque to yield a second value; and (f4) adding the target engine torque to the second value to yield a new requested engine torque less than the last requested engine torque thereby decaying the engine torque.

9. A vehicle drive system comprising:

an engine having an engine output shaft with an engine torque;

a transmission having a transmission input shaft coupled to said engine output shaft and a transmission output shaft selectively coupled to said transmission input shaft by a plurality of gears;

an intent switch for preparing to shift said transmission between said plurality of gears;

an actuator for shifting between said plurality of gears when said intent switch is actuated; and a controller programmed to process an initial engine torque parameter, a zero torque parameter representing a transmission output shaft torque, and high and low band torque parameters wherein said zero torque parameter is between said high and low band torque parameters, said controller programmed to compare said initial engine torque parameter to said high band torque parameter and send a signal to increase said engine torque to said high band torque parameter if said initial engine torque parameter is less than said high band torque parameter, said controller programmed to energize said actuator when said engine torque is at the greater of said initial engine torque and high band torque parameters, and said controller programmed to decay said engine torque toward said low band torque parameter to facilitate engaging and disengaging transmission gears.

10. The vehicle drive system as set forth in claim 9 wherein said zero torque parameter is an estimate of said transmission output shaft torque.

11. The vehicle drive system as set forth in claim 10 wherein said actuator urges at least one of said plurality of gears out of engagement during said decay such that said gear should move out of engagement when said engine torque approximates said transmission output shaft torque.

12. The vehicle drive system as set forth in claim 11 further including an indicator that becomes activated if said actuator fails to urge at least one of said plurality of gears out of engagement.

13. The vehicle drive system as set forth in claim 12 wherein said controller is programmed to maintain said engine torque at the greater of said initial engine torque and high band torque parameters for a period of time selected to provide said actuator sufficient time to fully energize.

* * * * *

UNITED STATES PATENT AND TRADEMARK OFFICE
CERTIFICATE OF CORRECTION

PATENT NO. : 6,126,570
DATED : October 3, 2000
INVENTOR(S) : Bohm et al.

Page 1 of 1

It is certified that error appears in the above-identified patent and that said Letters Patent is hereby corrected as shown below:

<u>Title page,</u>
Assignee should read as follows:

-- Item [73] Assignee: ZF Meritor, Laurinburg, N.C.
                      WABCO Standard GmbH & Co. OHG, Hannover, Germany --

Signed and Sealed this

Eighteenth Day of December, 2001

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.     : 6,126,570
DATED          : October 3, 2000
INVENTOR(S)    : Bohm et al.

Page 1 of 1

It is certified that error appears in the above-identified patent and that said Letters Patent is hereby corrected as shown below:

<u>Title page,</u>
Assignee should read as follows:

-- Item [73] ZF Meritor, Laurinburg, N.C.
         WABCO Standard GmbH, Hannover, Germany --

This certificate supersedes Certificate of Correction issued December 18, 2001.

Signed and Sealed this

Twenty-fourth Day of September, 2002

Attest:

Attesting Officer

JAMES E. ROGAN
*Director of the United States Patent and Trademark Office*